United States Patent [19]
Kudoh

[11] Patent Number: 5,414,702
[45] Date of Patent: May 9, 1995

[54] PACKET DISASSEMBLER FOR USE IN A CONTROL UNIT OF AN ASYNCHRONOUS SWITCHING SYSTEM

[75] Inventor: Norimasa Kudoh, Kawasaki, Japan

[73] Assignee: Kabushiki Kaisha Toshiba, Kawasaki, Japan

[21] Appl. No.: 137,927

[22] Filed: Oct. 19, 1993

[30] Foreign Application Priority Data

Oct. 20, 1992 [JP] Japan .................................. 4-281849

[51] Int. Cl.$^6$ ........................ H04J 3/74; H04L 12/56; H04Q 11/04
[52] U.S. Cl. ....................................... 370/60; 370/94.1
[58] Field of Search ............... 370/58.1, 58.2, 58.3, 370/60, 60.1, 61, 79, 82, 83, 94.1, 94.2, 99

[56] References Cited

U.S. PATENT DOCUMENTS

| | | | |
|---|---|---|---|
| 5,101,404 | 3/1992 | Kunimoto et al. | 370/60 |
| 5,113,392 | 5/1992 | Takiyasu et al. | 370/94.1 |
| 5,128,931 | 7/1992 | Yamanaka et al. | 370/60 |
| 5,173,897 | 12/1992 | Schrodi et al. | 370/60 |
| 5,214,642 | 5/1993 | Kunimoto et al. | 370/82 |
| 5,233,606 | 8/1993 | Pashan et al. | 370/60 |

Primary Examiner—Alpus Hsu
Attorney, Agent, or Firm—Finnegan, Henderson, Farabow, Garrett & Dunner

[57] ABSTRACT

A packet disassembler, which eliminates the need of an upper-level processor to have an excessive processing ability, includes a plurality of fixed-length buffers having a storage capacity corresponding to a multiple of the byte length of an information field of input packets having a predetermined fixed length and each of the fixed-length buffers has an identical length. Also included in the packet disassembler is manager which, when disassembling ones of the input packets having an identical connection identifier within their headers or having a multiplexing identifier on the same connection is not completed, performs allocation control of associating the packets having the identical identifier with one of the plurality of fixed-length buffers having the identical identifier, and when the disassembling of the packets having the identical identifier is completed or when no disassembling of the packets having the identical identifier is carried out, performs allocation control of associating the associated packets with an empty one of the plurality of fixed-length buffers.

10 Claims, 5 Drawing Sheets

PACKET DISASSEMBLER FOR USE IN A CONTROL UNIT OF AN ASYNCHRONOUS SWITCHING SYSTEM

BACKGROUND OF THE INVENTION

1. Field of the Invention

The present invention relates to a packet disassembler used in communication where there is no time transparency in the timing between packet assembly and disassembly, which packet disassembler has a plurality of buffers of a fixed length in which disassembly of packets is performed, and more particularly, to a packet disassembler which is suitably used in a controlling unit of an asynchronous transfer mode (ATM) switching system.

2. Description of the Related Art

Packet communication requires dividing a transmission frame into packets of a fixed length (which packets will be called "cells", and which division function will be called the cell-assembling function, hereinafter), disassembling cells, and then assembling them into a frame (which function is called the cell-disassembling function, hereinafter). In the cell-assembling and cell-disassembling functions, a buffer plays an important role. ATM communication is carried out using ATM cells.

Explanation will be made as to two types of prior art arrangements of buffers for implementing the cell-disassembling function.

In one type of prior art arrangement, a packet disassembler has fixed-length buffers having a length equal to or more than the length of a frame for which input ATM cells are disassembled for each connection identifier (VCI) indicative of connection therebetween or a multiplexing identifier (MID).

The plurality of fixed-length buffers are used as work buffers for the cell-disassembling operation, and writing is controlled on the basis of the connection identifier and multiplexing identifier received from an ATM layer so that the information fields of the ATM Cells having the same VCI or MID are assembled within one of the fixed-length buffers allocated to the connection identifier. The completion of the assembling operation is detected by a segment type (ST) field within the ATM cell and the assembled frame is read out and passed to an upper protocol layer.

In the other type of prior art arrangement, the buffers are of a short length corresponding to the size of the information field of the ATM cell to be assembled, and a releasable region having the short buffer is provided so that the short buffer is shared with the different connection identifiers or the different multiplexing identifiers on the connections.

The information fields of the input ATM cells are written in the releasable short buffer, and on the basis of the connection identifier or multiplexing identifier on the same connection received from an ATM layer, the information fields of the ATM cells having the same VCI or MID are assembled.

In the first arrangement in which the buffers are arranged to have respectively a long fixed length equal to or more than the maximum length of frames to be disassembled, when a particular connection is frequently used, its buffer operating efficiency becomes low. The second arrangement is designed to solve the above problem in the first arrangement and to increase memory operating efficiency by utilizing a fact that a buffer is usually made up of a memory and thus the buffer operating efficiency is equivalent to the memory operating efficiency.

However, the arrangement of the first and second buffers has a disadvantage that, since one of the buffers is selected on the basis of the connection identifier or multiplexing identifier on the same connection to be used as a buffer fixed to the identifier, even when the assembling of the frame for the identifier is completed, the next assembling of the frame for the same identifier cannot be carried out until the upper-level layer processor accepts the frame.

Assume, for example, that nine cells A1 to A9 having an identifier 'a', three cells B1 to B3 having an identifier 'b' and 3 cells C1 to C3 having an identifier 'c' are sequentially input and it is desired to disassemble them with use of first and second fixed-length buffers each having a length corresponding to about three cells. Then, since the first fixed-length buffer is fixedly allocated to the identifier 'a', it is impossible to disassemble the cell A4 having the identifier 'a', so long as an information signal indicative of the completion of the cell-disassembling operation of the cells A1 to A3 having the same identifier 'a' is not received by the upper-level processor.

This requires the processing ability of the upper layer processor to be increased to such an extent that the reception of the frame can be within the minimum arrival interval of the fixed-length packets.

SUMMARY OF THE INVENTION

It is an object of the present invention to provide a packet disassembler which can carry out disassembling operation over packets while eliminating the need of an upper-level processor to have an excessive frame processing ability.

In accordance with an aspect of the present invention, the above object is attained by providing a packet disassembler for disassembling a plurality of packets each having an information field of a predetermined fixed information length and having an identifier indicative of connection with other packets into a frame to be processed by an upper-level processor, comprising a plurality of fixed-length buffers each having an identical length and having a storage capacity equal to an multiple of said predetermined fixed information length; and management means for performing allocation control of allocating a newly input packet to a fixed-length buffer under disassembling of said plurality of fixed-length buffers having said identical identifier when disassembling of previously input packets having the identifier equal to that of the newly input packet is not completed, and for performing allocation control of allocating the newly input packet with empty one of said plurality of buffers when the disassembling of the previously input packets having the identical identifier is completed or when no disassembling of packets having the identical identifier is carried out.

Since the relationship between the frame buffer number and connection identifier is varied according to the different frame assemblies, the present invention has an advantage that, after completion of the frame assembly for an identifier, even when the upper-level processor has not received the frame yet, the frame assembly of the same identifier can be realized and thus the need of the upper-level processor to have an excessive processing ability can be eliminated and efficient cell-disassembling function and communication processing can be realized.

DESCRIPTION OF THE PREFERRED EMBODIMENTS

Embodiments of the present invention will be described with reference to the accompanying drawings.

Explanation will first be made of the cell-assembling and cell-disassembling functions between frame and ATM cell, by referring to FIGS. 3 and 4.

Figure 3:
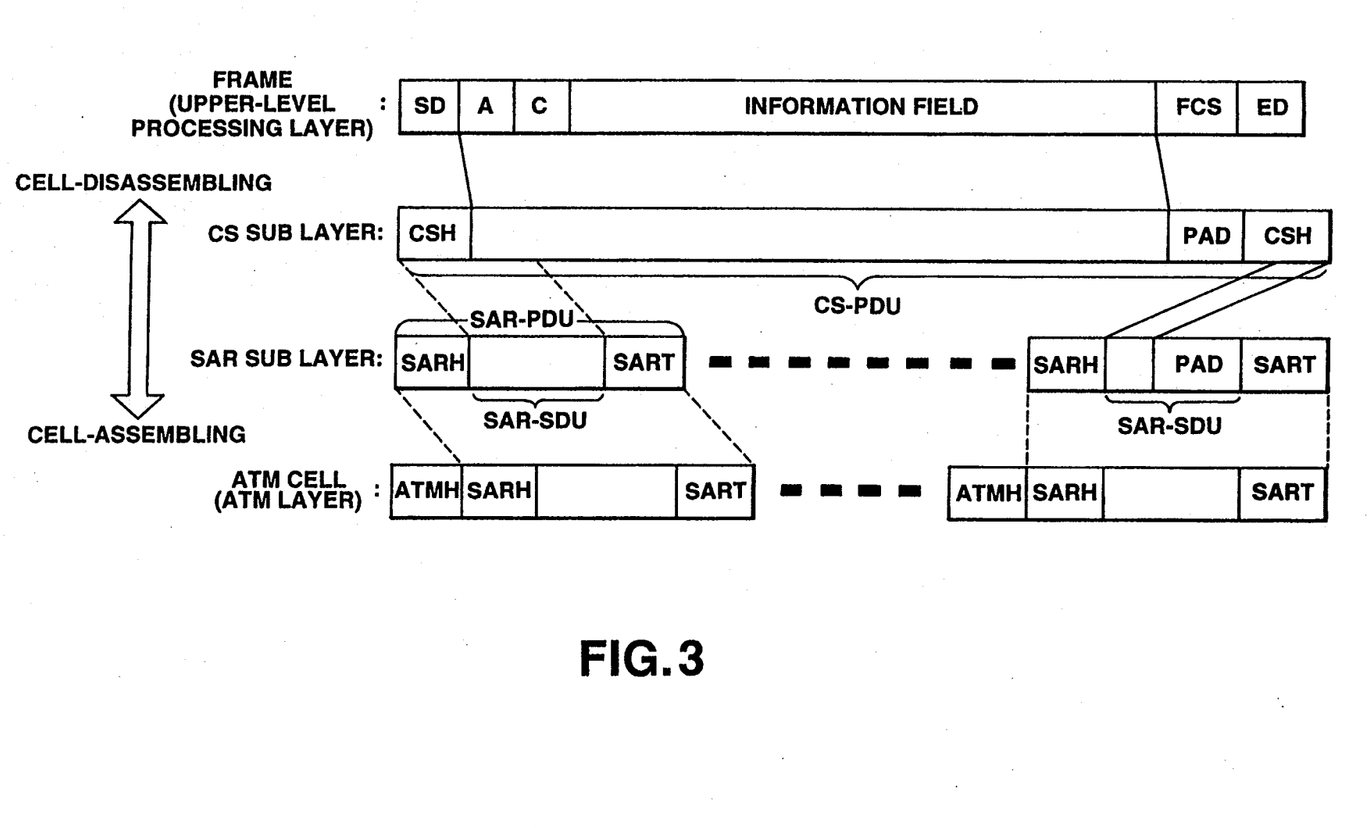
FIG. 3 is a diagram for explaining the cell-assembling and cell-disassembling functions of the invention.

FIG. 3 is a diagram for explaining the cell-assembling and cell-disassembling functions. The cell-assembling and cell-disassembling functions, which are done by using the functions of a convergence (CS) sublayer and a segmentation and reassembly (SAR) sublayer, are implemented to an ATM adaptation layer as shown in FIG. 3.

In more detail, as shown in FIG. 3, in the cell-assembling operation, a frame is divided eventually into ATM cells through the CS and SAR sublayers. A frame has a start delimiter SD, an address field A, a control field C, an information field, a frame check sequence FCS and an end delimiter. A frame input to the CS sublayer is attached by a header CSH of the CS sublayer and a trailer CST thereof. When the input frame correspond in byte number to a multiple of a preset integer of $\beta$ bytes, such a field PAD as shown in the CS sublayer of FIG. 3 is inserted into the CS sublayer (which inserting operation will be called padding, hereinafter). A CS sublayer protocol data unit CS-PDU issued from the CS sublayer is input to the SAR sublayer and divided into cell data units SAR-SDU each attached by an SAR header SARH and an SAR trailer SART, which are then output to the ATM layer attached to an information field ATMH, that is, as ATM cells. The cell-disassembling operation is carried out by reversely performing the cell-assembling operation.

Figure 4:
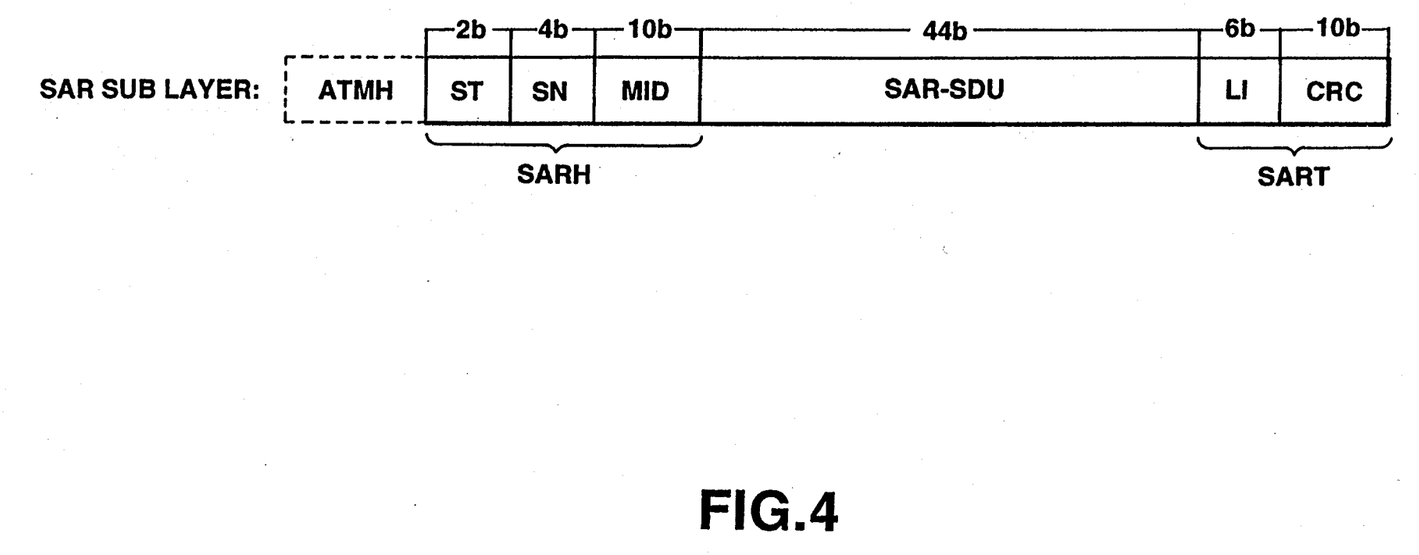
FIG. 4 is an example of the format of an SAR sublayer.

Shown in FIG. 4 is an example of a format of an SAR sublayer, in which reference symbol ST denotes segment type by which each of the cells transmitted after the division of the CS sublayer protocol data unit CS-PDU into cells is to be positioned at the head BOM (beginning of message) of the frame cells, in the middle COM (continuing of message), at the end EOM (ending of message), or an independent single cell. Symbol SN denotes a sequence number of a 4-bit length which value is determined by modulo 16. Symbol MID denotes a multiplexing identifier, LI an effective information length of the cell except for the padding, CRC an error detection code. The field SARH is made up of the ST, SN and MID, while the field SART is made up of the LI and CRC. The SARH and SART contain information necessary for assembling into the CS sublayer protocol data unit CS-PDU. The cell-disassembling operation of the SAR sublayer is carried out with use of these fields. When a mismatching is found in these fields, the corresponding cell is discarded. The discarding of a cell results in discarding the CS-PDU which includes the discarded cell.

Explanation will next be made as a packet disassembler for performing the cell-disassembling operation.

Figure 1:
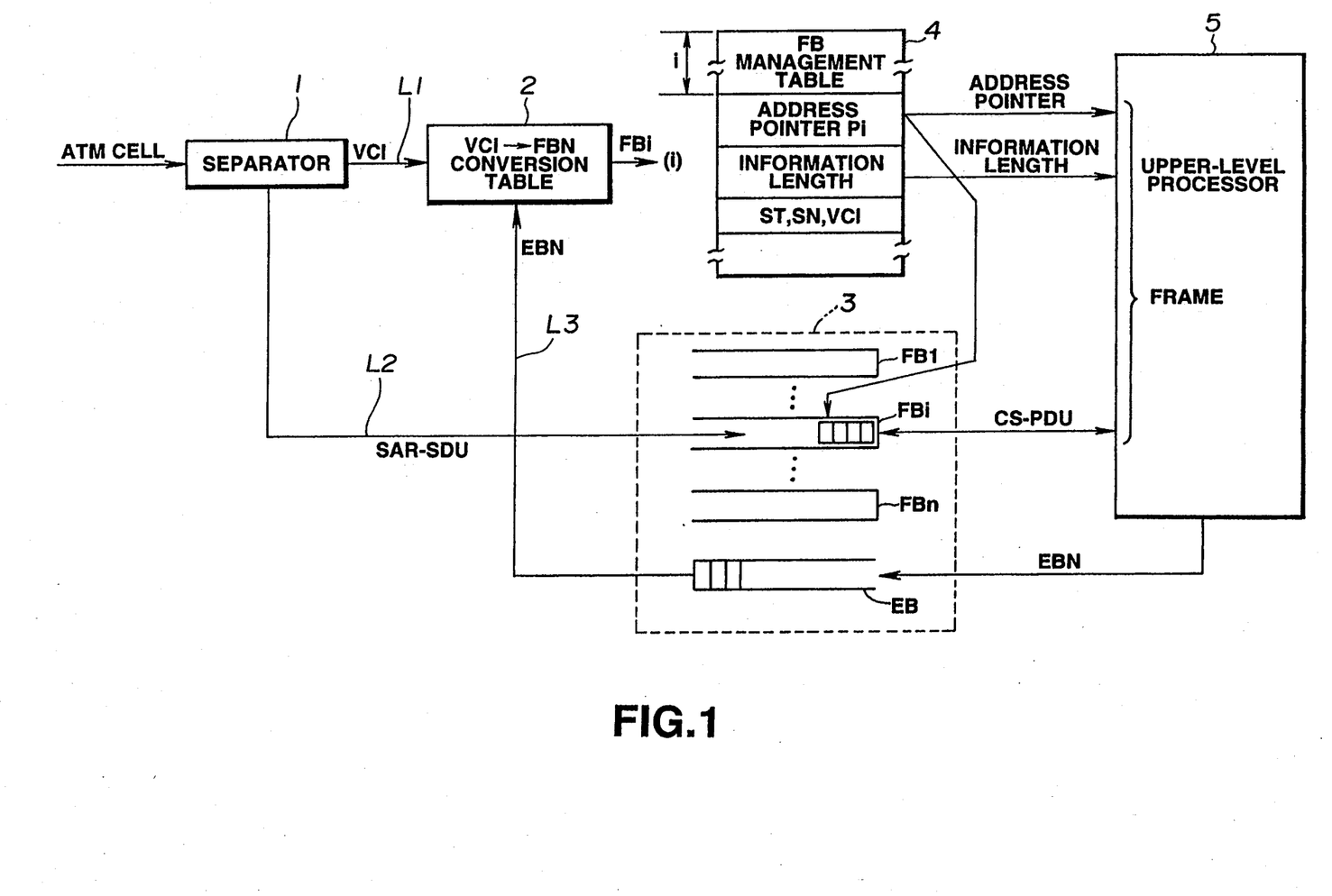
FIG. 1 schematically shows an arrangement of a packet disassembler in accordance with a first embodiment of the present invention.

FIG. 1 schematically shows an arrangement of a packet disassembler in accordance with a first embodiment of the present invention.

A connection identifier is constituted by a virtual path identifier (VPI) and a virtual channel identifier (VCI). For simplicity of description, only VCI is used as a connection identifier in the following description.

The packet disassembler of FIG. 1 includes a separator 1 for separating an input ATM cell into an ATM header having a connection identifier VCI and a SAR-PDU and for further separating the SAR-PDU into an SAR-SDU as its real information, a header SARH and an SAR trailer SART; a conversion table 2 for converting the VCI other than the SAR-SDU received from the separator 1 into a corresponding frame buffer number FBN and outputting the frame buffer number; a buffer device 3 having a plurality of frame buffers FB1 to FBn for assembling the SAR-SDUs into a CS sublayer protocol data unit CS-PDU and having an empty frame buffer EB for accumulating therein empty frame buffer numbers; an FB management table 4 for managing the assembling state of the CS sublayer protocol data unit CS-PDU by the frame buffers FB1 to FBn of the buffer device 3; and an upper-level processor 5 for receiving the CS sublayer protocol data unit CS-PDU assembled by the buffer device 3 and generating a frame therefrom.

In the illustrated example, the plurality of frame buffers FB1 to FBn are of a fixed length longer than the maximum length of the CS sublayer protocol data units CS-PDUs.

The conversion table 2, on the basis of the VCI received from the separator 1 through a line L1 and the empty frame buffer number EBN corresponding to the number of the frame buffer that became empty by the reception of the CS-PDU by the upper-level processor 5, selects and outputs the frame buffer number FBN of one of the frame buffers receiving the SAR-SDU corresponding to the input VCI.

More specifically, when the SAR-SDU on the connection indicated by the input VCI is being assembled in the frame buffers FB1 to FBn, the conversion table 2 selects the number FBN of the frame buffer being assembled and outputs it to the FB management table 4. In the condition that the assembling operation has been completed but the upper-level processor 5 has not received the completed CS-PDU yet from the buffer device 3, if an ATM cell with BOM on the connection is input, the cell is discarded due to the lack of disassembling buffers. To avoid this situation, according to this invention, the conversion table 2 selects an empty frame buffer number EBN and outputs it to the FB management table 4 as the frame buffer number FBN. In this connection, the frame buffer number FBN being assembled corresponding to the VCI selectively output from the buffer device 3 or the frame buffer number FBN corresponding to the empty frame buffer number EBN corresponds to a management address 'i' in the FB management table 4.

The FB management table 4 is subjected to a retrieval with use of the management address 'i' received from the conversion table 2 to obtain an address pointer Pi according to which the SAR-PDU of the frame buffer FBi indicated by the conversion table 2 is positioned, and the current assembly information length, ST, SN, VCI, etc. of the frame buffer FBi. Further, whenever the FB management table 4 receives the management address 'i', the management information on the frame buffer FBi are updated. When an assembling operation in the frame buffer is newly started, such management information including the address pointer Pi are set at their initial values.

The SAR-SDU received from the separator 1 via a line L2 is stored at a position of the buffer device 3 corresponding to an address shown by the address pointer Pi of the FB management table 4. This address indicates not only the address of the frame buffer having the frame buffer number FBi selected by the VCI of the currently-input SAR-SDU but also indicates a specific address within the frame buffer FBi having the SAR-SDU actually stored therein.

Thereafter, since the FB management table 4 manages the respective frame buffers FB1 to FBi, when the table has such a frame buffer that its assembling operation has been completed therein, the FB management table 4 requires the upper-level processor 5 to receive a CS-PDU within the corresponding frame buffer. When the upper-level processor 5 responds to such a request from the FB management table 4, the FB management table 4 notifies the upper-level processor 5 of the address pointer Pi of the CS-PDU within the corresponding frame buffer, that is, its header address and the information length indicative of the substantial information length of the CS-PDU.

The upper-level processor 5, when receiving such a notification from the FB management table 4, reads out the already assembled CS-PDU by an amount corresponding to the information length from the buffer device 3 on the basis of the received address pointer Pi, extracts only necessary information from the read-out CS-PDU, and attaches SD, FCS and ED to the extracted information to obtain a frame. The frame buffer number FBi of the frame buffer which has so far stored the extracted CS-PDU is sequentially stored in the empty frame buffer EB, and then output to the conversion table 2 as the empty frame buffer number EBN in the storage order.

As such processing is repeated in this way, a CS-PDU made up of a plurality of the SAR-SDUs is sequentially assembled in the frame buffers FB1 to FBn.

In this way, since an empty frame buffer can be immediately known, there can be realized such a packet disassembler that can increase the operating efficiency of the frame buffers and which can lighten the burden or load imposed on the upper-level processor 5.

Next, explanation will be made as to a detailed example embodying the packet disassembler of FIG. 1.

Figure 2:
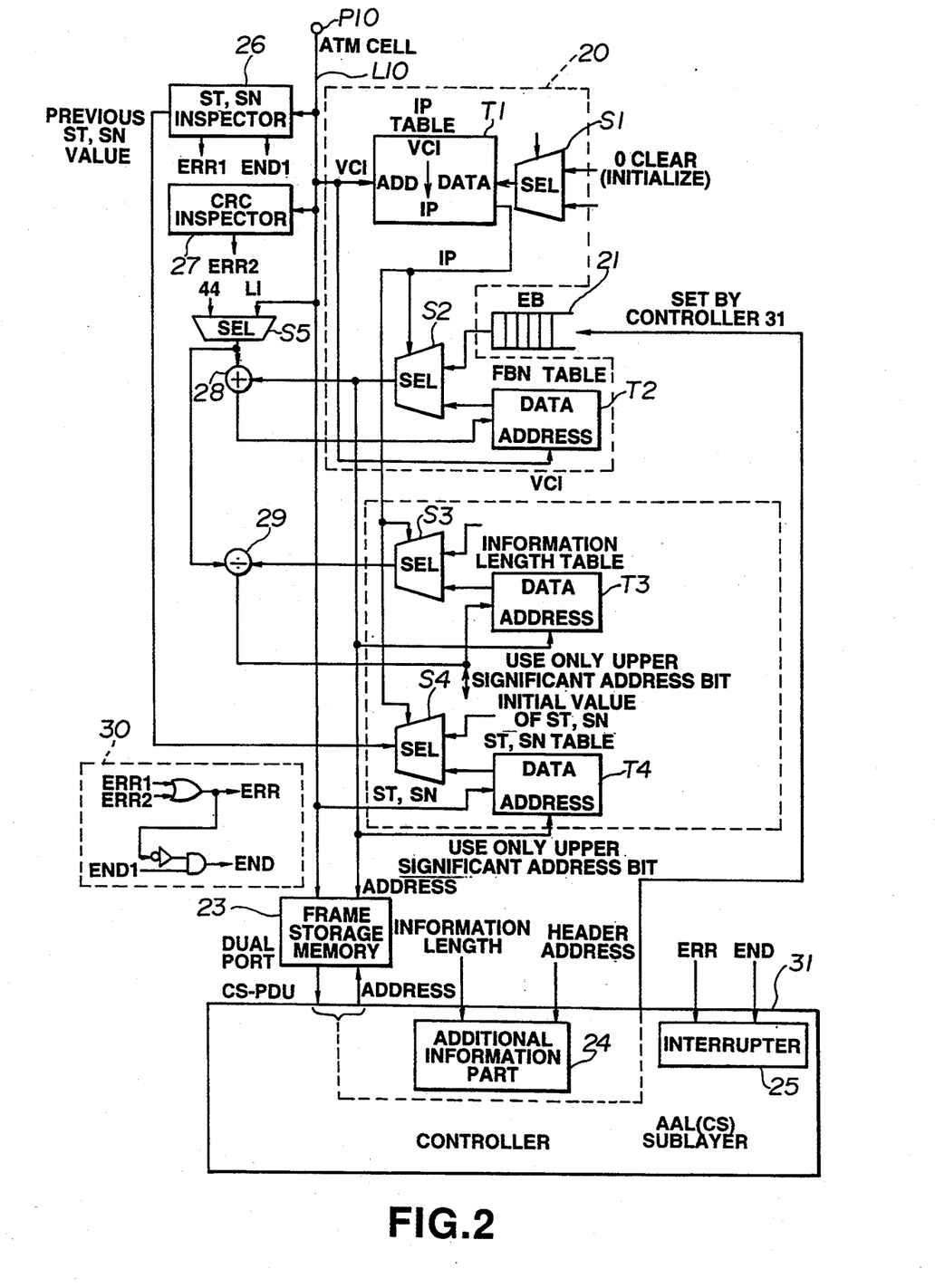
FIG. 2 is a detailed arrangement of a packet disassembler in accordance with a first embodiment of the present invention.

FIG. 2 is a detailed example of the packet disassembler in accordance with the first embodiment of the present invention.

In FIG. 2, a converter 20 corresponds to the conversion table 2 in FIG. 1, a manager 22 to the FB management table 4 in FIG. 1, a frame storage memory 23 to the buffer device 3 in FIG. 1, a controller 31 to the upper-level processor 5, respectively.

In operation of the packet disassembler of FIG. 2, when an ATM cell is applied to a terminal P10, a VCI within the ATM header of the ATM cell is received in an IP table T1 through a line L10. The IP table T1, when receiving the VCI, outputs a flag IP (in-process flag) indicative of whether or not a SAR-SDU corresponding to the received VCI is being assembled within a frame buffer of the frame storage memory 23. The frame storage memory 23, when determining that the flag IP is being assembled in the frame buffer, sets the flag at "1"; otherwise, the memory 23 sets the flag at "0". A selector S1 functions to set the flag IP at "0" when receiving a signal END from an inspection circuit 30 (to be described later). That is, in most cases, when the segment type ST within the SAR header of the input SAR-PDU is EOM (ending of message), the flag IP is set at "0" and the SAR-SDU corresponding to the input VCI is judged as not being assembled in the frame storage memory 23.

Meanwhile, an ST/SN inspector 26 extracts the ST and SN (sequence number) from the SAR header and, on the basis of the previous ST and SN received from a selector S4, inspects the current input SAR-PDU. In this inspection, it is checked whether or not the current SAR-PDU is naturally estimated on the basis of the values of the previous ST and SN. For example, when the current and previous STs have an identical value and the previous ST is the EOM, such a situation that the current ST is COM (continuing of message) can be less possible, in which case the ST/SN inspector 26 outputs a signal ERR1 and discards the ATM cell. When the ST/SN inspector 26 detects the EOM while all previously inputted cells are normal, it means the ATM cell is the last cell of the message, and thus the ST/SN inspector 26 outputs a signal END1 indicative of the effect.

A CRC inspector 27 extracts a CRC from the input SAR trailer for error detection. When detecting an error caused by a line state during the communication, the CRC inspector 27 outputs a signal ERR2.

The inspection circuit 30, which has an OR circuit, an AND circuit, and an invertor, receives the signals ERR1 and END1 from the ST/SN inspector 26 and also receives the signal ERR2 from the CRC inspector 27. More specifically, the OR circuit, when receiving either one of the signals ERR1 and ERR2, outputs a signal ERR. Meanwhile, the AND circuit receives a signal corresponding to an inversion of the signal ERR sent from the OR circuit via the invertor, i.e., a signal indicative of no error and also receives the signal END1. Only when receiving the no-error signal and the signal END1, the AND circuit outputs a signal END.

The flag IP is issued from the IP table T1 on the basis of the received VCI, and then applied to a selector S2. The selector S2 in turn receives an empty frame buffer number EBN from the controller 31 through an empty frame buffer 21, i.e., the address of the empty frame buffer and also receives the number of a frame buffer being assembled from an FBN table T2, i.e., the address of the frame buffer being assembled. The FBN table T2, when receiving the VCI, outputs the frame buffer of the frame storage memory 23 corresponding to the VCI, i.e., the address of the corresponding frame buffer.

The selector S2, when receiving the flag IP of "1", selectively outputs the address of the frame buffer of the VCI being assembled received from the FBN table T2; whereas, the selector S2, when receiving the flag IP of "0", selectively outputs the address of an empty frame buffer.

The address of the selective output frame buffer is informed from the selector S2 to the frame storage memory 23 which in turn sequentially accumulates the SAR-SDU received on the basis of the received address to assembly into a CS-PDU.

A selector S5 receives a value of 44 bytes corresponding to the information length of the SAR-SDU and an in-cell effective length LI of the SAR trailer. When receiving the LI, the selector S5 selects the value LI; whereas, when receiving no LI, the selector S5 selectively outputs the value of 44 bytes as the effective length of the SAR-SDU. And, the address selectively issued from the selector S2 is added at an adder 28 to the value of the effective length selectively issued from the selector S5. An addition result is applied from the adder 28 to the FBN table T2 to update the address within the frame buffer being assembled. Thus, the address within the frame buffer previously being assembled can be held in the FBN table T2 when the next input SAR-SDU is to be assembled.

A selector S3 of the manager 22 receives the flag IP and also receives an input of "0" and the information length of the CS-PDU being assembled from the information length table T3. The information length table T3, only when receiving the upper one of the address selectively issued from the selector S2, outputs the information length of the CS-PDU being assembled.

The selector S3, when receiving the flag IP of "1", selectively outputs the information length received from the information length table T3; while, when receiving the flag IP of "0", the selector S3 selectively outputs the value of the information length set at "0".

The value of the information length issued from the selector S3 is added at an adder 29 to the value of the effective information length of the SAR-SDU selectively issued from the selector S5. An addition result is sent from the adder 29 to the information length table T3 to update the information length.

The selector S4 of the manager 22 receives the flag IP and also receives the initial values of the ST and SN and the final ST and SN in the current assembling stage of the CS-PDU from an ST/SN table T4, i.e., the previous ST and SN. The ST/SN table T4, only when receiving upper one of the address selectively received from the selector S2, outputs the previous ST and SN. The ST and SN of the this-time input SAR-PDU are input to the ST/SN table T4 to be updated to the previous ST and SN so that the updated ST and SN are used as the previous ST and SN of the next input SAR-PDU.

The selector S4 selectively outputs the previous ST and SN received from the ST/SN table T4 when the flag IP is "1"; whereas the selector S4 selectively outputs the ST and SN indicative of their initial values as the previous ST and SN when the flag IP is "0". The previous ST and SN selectively issued from the selector S4 are applied to the ST/SN inspector 26 to be used for inspection of the this-time input SAR-PDU.

As has been explained above, the SAR-SDU of the SAR-PDU for the input ATM cell on the bus line L10 is accumulated in a predetermined frame buffer within the frame storage memory 23 according to the address received from the converter whereby a CS-PDU is assembled.

Meanwhile, an interrupter 25 of the controller 31, when receiving the signal ERR or END from the inspection circuit 30, generates an interrupt signal. After generating the interrupt signal for its interrupting operation, the interrupter 25, when receiving the signal ERR, performs its predetermined error operation; while, when receiving the signal END, the interrupter 25, on the basis of additional information issued from an additional information part 24 and containing the information length and header address issued from the information length table T3, takes out the CS-PDU assembled in the frame buffer of the frame storage memory 23 to prepare a frame. And the address of the frame buffer having the taken-out CS-PDU accumulated so far therein is output to the empty frame buffer 21, and the number EBN of the empty frame buffer 21 is sequentially output to the selector S2 in the storage order.

In the above described manner, the information SAR-SDU of the SAR-PDU for the ATM cell entered through the bus line L10 but with the ATM header removed is disassembled within the frame buffer into a CS-PDU which is eventually prepared into a frame. In this case, the frame buffer can be a frame buffer being assembled or a variable frame buffer as an empty frame buffer. In addition, the empty frame buffer is set to be so after reception of the assembled CS-PDU. Thus, no load can be applied to the upper-level processor and the memory can be efficiently used.

Consider now that, as already explained in the prior art, 9 cells A1 to A9 having an identifier 'a', 3 cells B1 to B3 having an identifier 'b', and 3 cells C1 to C3 having an identifier 'c' are sequentially input; and that first and second fixed-length buffers each having a length corresponding to about 3 cells are provided for realizing the cell-disassembling operation. In the prior art, since the first fixed-length buffer is fixedly allocated to the identifier 'a', it is impossible to realize the cell-disassembling operation of the cells A4 to A6 having the same identifier 'a', so long as information telling the completion of cell-disassembling operation of the cells A1 to A3 having the identifier 'a' is not accepted by the upper-level processor. Similarly, it is impossible to realize the cell-disassembling operation of the cells A7 to A9 having the same identifier 'a', so long as information telling the completion of cell-disassembling operation of the cells A4 to A6 having the same identifier 'a' is not accepted by the upper-level processor.

In the present embodiment, on the other hand, the first fixed-length buffer is allocated to the same identifier 'a' and the cell-disassembling operation of the cells A1 to A3 having the identifier 'a' is completed, but even when the acceptation of the completion indication information by the upper-level processor is not completed yet, the cell A4 having the identifier 'a' can be allocated to the second fixed-length buffer.

Although the buffer arrangement in the packet disassemblers of FIGS. 1 and 2 has been set to have a buffer length corresponding to the maximum length of the CS-PDU, it may be set to have a short buffer length corresponding to the length of the SAR-SDU or the like.

Figure 5:
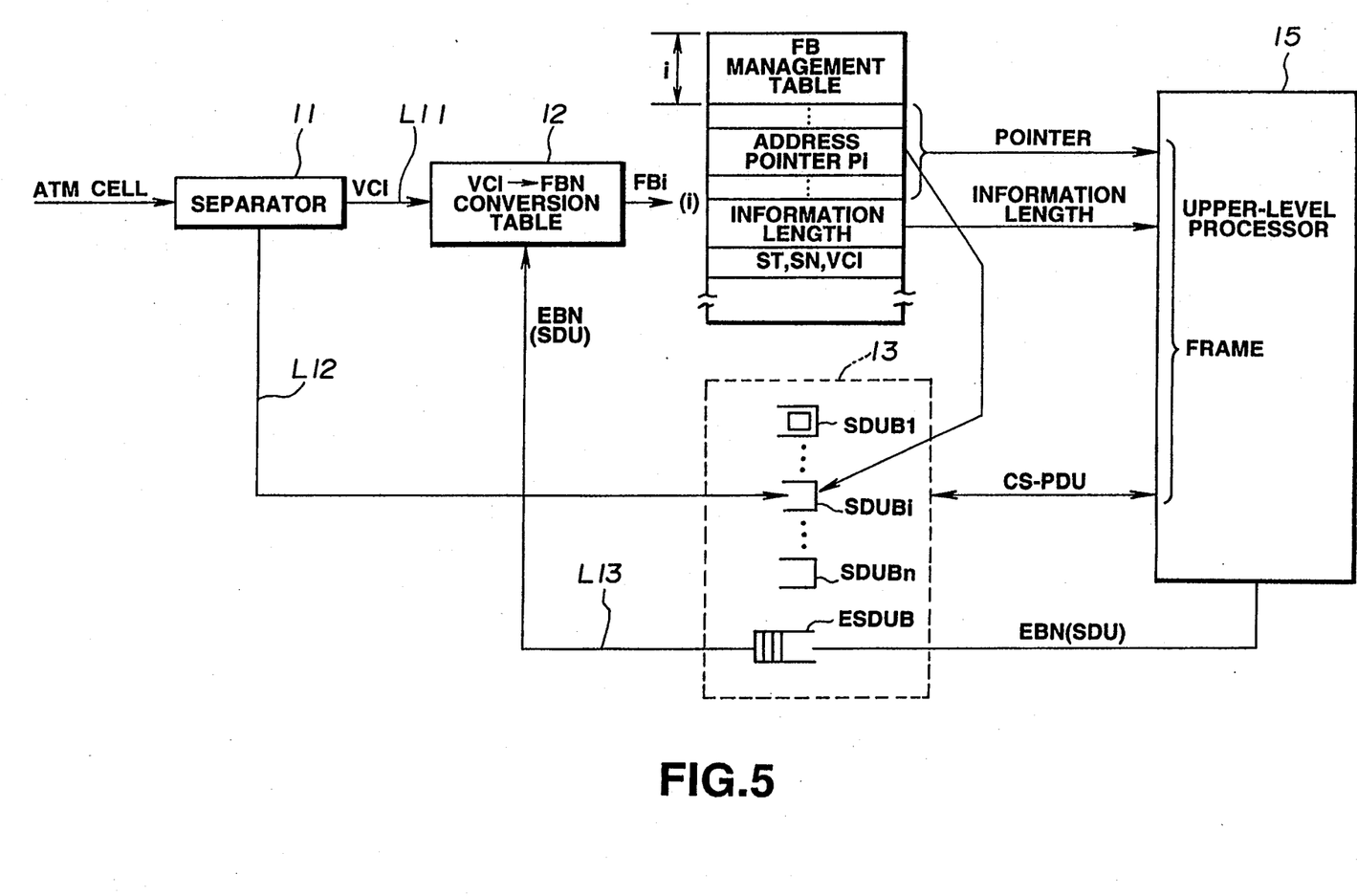
FIG. 5 is a schematic arrangement of the packet disassembler of the second embodiment of the invention.

FIG. 5 schematically shows an arrangement of a packet disassembler in accordance with a second embodiment of the present invention.

The packet disassembler of FIG. 5 includes a separator 11 for separating an input ATM cell into an ATM header having a connection identifier VCI and a SAR-PDU and for further separating the SAR-PDU into an SAR-SDU as its real information, a header SARH and an SAR trailer SART, a conversion table 12 for converting the VCI other than the SAR-SDU received from the separator 11 into a corresponding virtual frame buffer number FBN and outputting the virtual frame buffer number, a buffer device 13 having a plurality of SDU buffers SDU1 to SDUn of an SAR-PDU length for assembling the SAR-SDUs into a CS sublayer protocol data unit CS-PDU and having an empty SDU buffer ESDUB for accumulating therein empty SDU buffer numbers, an FB management table 14 for managing the assembling state of the CS sublayer protocol data unit CS-PDU by the SDU buffers SDU1 to SDUn of the buffer device 13, and an upper-level processor 15 for receiving the CS sublayer protocol data unit CS-PDU assembled by the buffer device 13 and generating a frame therefrom.

The conversion table 12 selects and outputs the virtual frame buffer number FBN of one of the SDU buffers receiving the SAR-SDU corresponding to the input VCI on the basis of the VCI received from the separator 11 through a line L11 and the empty SDU buffer number ESDUBN corresponding to the number of the SDU buffer that became empty by the reception of the CS-PDU by the upper-level processor 15.

More specifically, when the SAR-SDU on the connection indicated by the input VCI is being assembled, the conversion table 12 selects the number FBN of the virtual frame buffer being assembled and outputs it to the FB management table 14. When the assembling operation has been completed but the upper-level processor 15 has not received the completed CS-PDU yet from the buffer device 13 or when there is no virtual frame buffer on the connection and it is desired to assemble a new CS-PDU, on the other hand, the conversion table 12 selects an empty virtual frame buffer number EBN and outputs it to the FB management table 14 as the frame buffer number FBN.

In this connection, the virtual frame buffer number FBN being assembled corresponding to the VCI selectively output from the buffer device 13 or the frame buffer number FBN corresponding to the empty frame buffer number EBN corresponds to a management address 'i' in the FB management table 14.

The FB management table 14 is subjected to a retrieval with use of the management address 'i' received from the conversion table 12 to obtain an address pointer Pi of the SDU buffer according to which the SAR-PDU of the virtual frame buffer FBi indicated by the conversion table 12 is positioned, and the current assembly information length, ST, SN, VCI, etc. of the frame buffer FBi. Further, whenever the FB management table 14 receives the management address 'i', these management information on the virtual frame buffer FBi are updated. The address pointers of the SDU buffers within the virtual frame buffer are linked to each other. When assembling operation in the virtual frame buffer is newly started, such management information including the address pointer Pi are set at their initial values.

The SAR-SDU received from the separator 11 via a line L12 is stored at a position of the buffer device 13 corresponding to an address shown by the real address pointer Pi within the virtual frame buffer of the FB management table 14.

Thereafter, since the FB management table 14 manages a plurality of the virtual frame buffers, when the table has such a virtual frame buffer that its assembling operation has been completed therein, the FB management table 14 requires the upper-level processor 15 to receive a CS-PDU within the corresponding virtual frame buffer. When the upper-level processor 15 responds to such a request from the FB management table 14, the FB management table 14 notifies the upper-level processor 15 of the header address pointer of the linked addresses of the SAR-SDUs of the CS-PDU within the corresponding virtual frame buffer and the information length indicative of the substantial information length of the CS-PDU.

The upper-level processor 15, when receiving such a notification from the FB management table 14, reads out the already assembled CS-PDU by an amount corresponding to the information length from the buffer device 13 sequentially from the address shown by the header address pointer, extracts only necessary information from the read-out CS-PDU, and attaches SD, FCS and ED to the extracted information to obtain a frame. And the SDU numbers of a plurality of the SDU buffers which had so far stored the extracted CS-PDU therein are sequentially stored in the empty frame buffer ESDUB, and then output to the conversion table 12 as the empty frame buffer numbers ESDUBN in the storage order.

As such processing is repeated in the above manner, a CS-PDU made up of a plurality of the SAR-SDUs is sequentially assembled. Since the length of such basic assembling information is set on a buffer basis, the operating efficiency of the buffers can be increased.

Although the assembling of the CS-PDU has been carried out for each connection identifier (VCI) in the ATM header to realize efficient selection and use of the buffers in the first and second embodiments, the efficient selection and use of the buffers may be effected not for each connection identifier but for each of a plurality of multiplexing identifiers (MID) within the SAR header on the associated connection.

Since the relationship between the frame buffer number and connection identifier is varied according to the different frame assemblies, the present invention has an advantage that, after completion of the frame assembly for an identifier, even when the upper-level processor has not received the frame yet, the frame assembly of the same identifier can be realized and thus the need of the upper-level processor to have an excessive processing ability can be eliminated.

What is claimed is:

1. A packet disassembler for disassembling a plurality of packets, each having an information part of a predetermined fixed information length and an identification part including an identifier indicative of a connection with other packets into a frame to be processed by an upper-level processor, comprising:

a plurality of fixed-length buffers, each having an identical length and having a storage capacity equal to a multiple of said predetermined fixed information length; and management means for performing allocation control for allocating a newly input packet, one of said plurality of fixed-length buffers having an identifier identical to the identifier of the newly input packet when disassembling of previously input packets having an identifier identical to that of the newly input packet is not completed, and for performing allocation control for allocating the newly input packet to an empty one of said plurality of fixed-length buffers when the disassembling of the previously input packets having the identical identifier is completed or when no disassembling of packets having the identical identifier is carried out.

2. A packet disassembler as set forth in claim 1, wherein each of said plurality of fixed-length buffers has a length equal to or larger than that of said frame.

3. A packet disassembler as set forth in claim 1, further comprising another buffer for storing a frame buffer number of said fixed-length buffer where input packets were disassembled as the frame buffer number of an empty fixed-length buffer when said disassembling is completed and a series of the information parts in the packets are transmitted to said upper-level processor, and wherein said management means extracts the frame buffer number of an empty fixed-length buffer from said another buffer when an empty fixed-length buffer is necessary.

4. A packet disassembler as set forth in claim 1, wherein said management means includes:

a buffer number table for designating a frame buffer number of one of said fixed-length buffers having the same identifier where the disassembly is being performed when it is determined that disassembling of input packets having the same connection identifier is not completed on the basis of said identifier of said input packets and position information indicative of positions of said input packets having the same identifier, and for designating a frame buffer number of an empty one of said plurality of fixed-length buffers when it is judged that the disassembling of said input packets having the same connection identifier is completed on the basis of said position information or when the disassembling of said input packets having the same identifier is not performed; and a management table for updating or newly setting a disassembling state of the fixed-length buffer having a frame buffer number received from said buffer number table based on said frame buffer number, for indicating an address within the fixed-length buffer in which the input packets are to be stored, and for informing said upper-level processor of the completion of the disassembling.

5. A packet disassembler as set forth in claim 4, wherein said position information includes segment type information (ST) and sequence number information (SN) in said input packets.

6. A packet disassembler as set forth in claim 5, further comprising detection means for comparing the current ST and SN of said input packet with the ST and SN of the previous packet having the same identifier as said input packet to detect an abnormality in the input packets; and means for discarding said input packet when said detection means detects abnormality.

7. A packet disassembler as set forth in claim 1, wherein said newly input packet is an ATM cell and said identifier is a connection identifier within a header of the ATM cell.

8. A packet disassembler as set forth in claim 7, wherein said identifier is a multiplexing identifier having the same identifier as the connection identifier within a header of the ATM cell.

9. A packet disassembler for disassembling a plurality of input packets each having an information part of a predetermined fixed information length and an identification part including an identifier indicative of a connection with other packets into a frame to be processed by an upper-level processor, comprising:

separation means for separating each of said packets into the information part and the identification part;

a plurality of fixed-length buffers each having an identical length and having a storage capacity equal to a multiple of said predetermined fixed information length;

another buffer for storing a frame buffer number of said fixed-length buffer where the packets were disassembled as a frame buffer number of an empty fixed-length buffer when said disassembling is completed and a series of the information parts in the packets are transmitted to said upper-level processor; and management means for performing allocation control for allocating a newly input packet to one of said plurality of fixed-length buffers having an identifier identical to the identifier of the newly input packet when disassembling of previously input packets having an identifier identical to that of the newly input packet in the identification part separated by said separation means is not completed, and for performing allocation control for allocating the newly input packet with an empty one of said plurality of buffers when the disassembling of the previously input packets having the identical identifier is completed or when no disassembling of packets having the identical identifier is carried out.

10. A packet disassembler for disassembling a plurality of packets, each having an information part of a predetermined fixed information length and an identification part including an identifier indicative of connection with other packets so as to generate a frame to be processed by an upper-level processor, comprising:

a plurality of fixed-length buffers having a length identical to the predetermined fixed information length; and management means for successively linking a predetermined number of vacant fixed-length buffers from which data was transmitted to the upper-level processor so as to generate a series of linked fixed-length buffers having an information length equal to a length of the predetermined fixed information length multiplied by the predetermined number, and for performing allocation control for allocating a newly input packet to the series of linked fixed-length buffers having identifiers identical to that of the newly input packet, the allocation control for the fixed-length buffers being performed based on an order of the linking when disassembling of previously input packets having an identifier identical with that of the newly input packet-is not completed, and for performing allocation control for allocating the newly input packet to the series of linked vacant fixed-length buffers, the allocation to a vacant fixed-length buffer of the series of linked fixed-length buffers being performed based on an order of the linking when the disassembling of the packets having the identical identifier is completed or when no disassembling of the packets having the identical identifier is carried out.

* * * * *

UNITED STATES PATENT AND TRADEMARK OFFICE
CERTIFICATE OF CORRECTION

PATENT NO. : 5,414,702
DATED : May 09, 1995
INVENTOR(S) : Norimasa KUDOH

It is certified that error appears in the above-indentified patent and that said Letters Patent is hereby corrected as shown below:

Claim 10, Column 12, Line 53, "packet-is" should read --packet is--.

Signed and Sealed this

Thirtieth Day of January, 1996

Attest:

BRUCE LEHMAN

*Attesting Officer*  *Commissioner of Patents and Trademarks*